Sept. 16, 1924.                                                    1,508,753
F. H. SLEEPER ET AL
MACHINE FOR CUTTING WIRE INTO LENGTHS
Filed Feb. 3, 1923                    4 Sheets-Sheet 1

Inventors.
Frank H. Sleeper
James A. Horton
BY ATTORNEYS
Southgate & Southgate

Sept. 16, 1924.    1,508,753
F. H. SLEEPER ET AL
MACHINE FOR CUTTING WIRE INTO LENGTHS
Filed Feb. 3, 1923    4 Sheets-Sheet 2
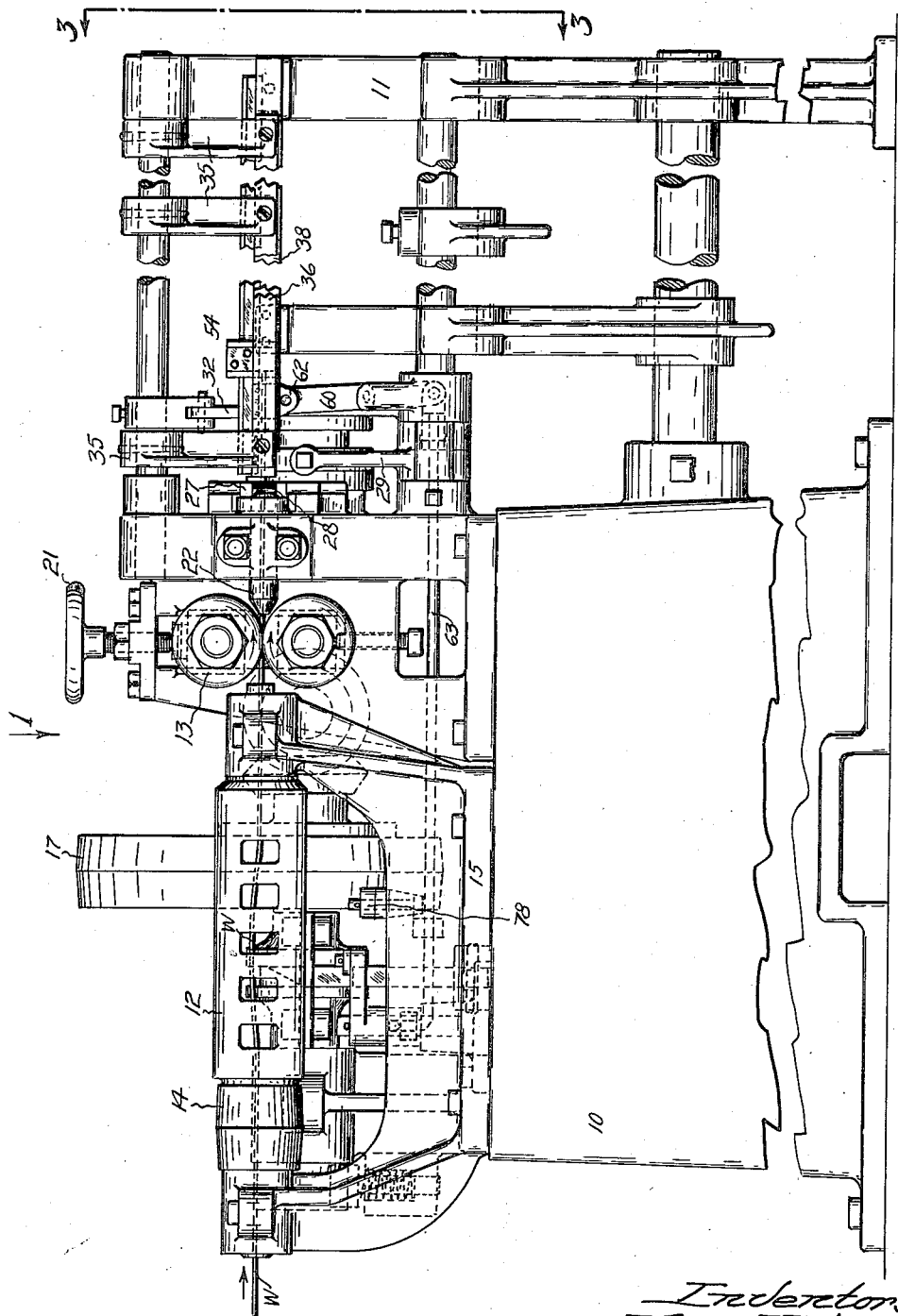

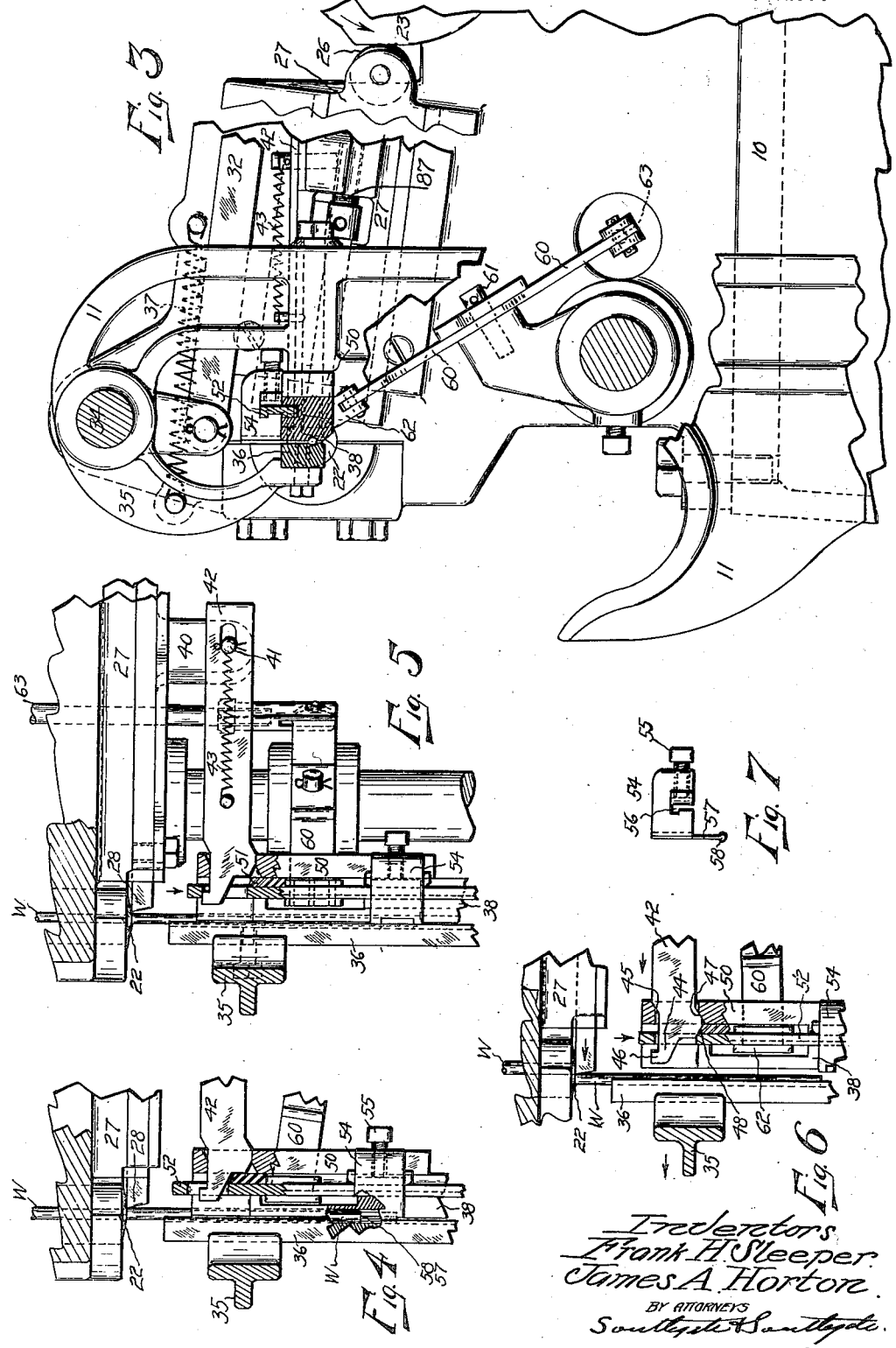

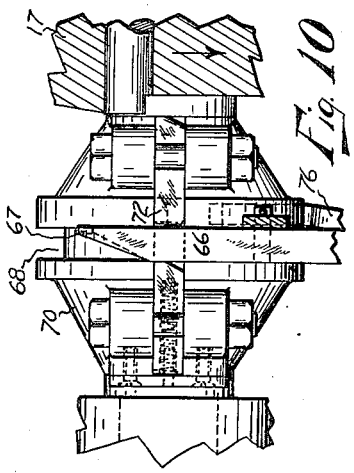
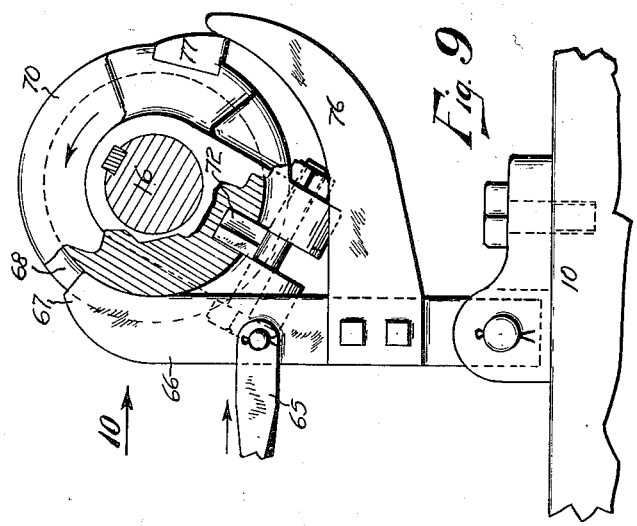
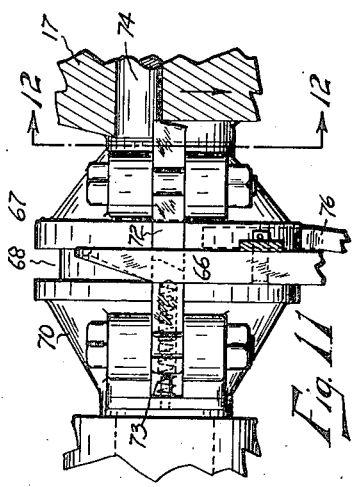
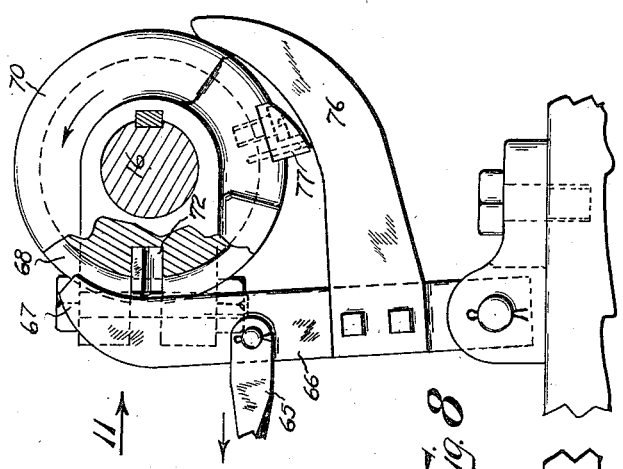
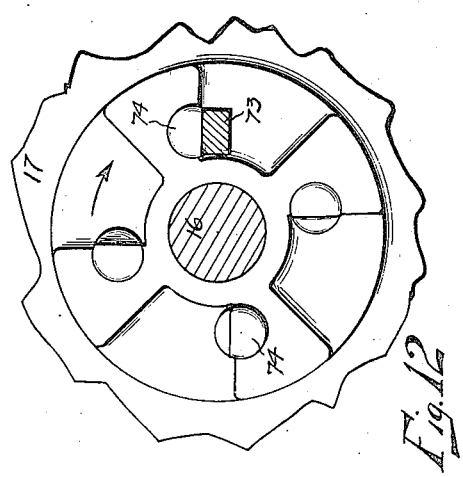

Patented Sept. 16, 1924.

1,508,753

UNITED STATES PATENT OFFICE.

FRANK H. SLEEPER AND JAMES A. HORTON, OF WORCESTER, MASSACHUSETTS, ASSIGNORS TO SLEEPER & HARTLEY, INC., OF WORCESTER, MASSACHUSETTS, A CORPORATION OF MASSACHUSETTS.

MACHINE FOR CUTTING WIRE INTO LENGTHS.

Application filed February 3, 1923. Serial No. 616,804.

*To all whom it may concern:*

Be it known that we, FRANK H. SLEEPER and JAMES A. HORTON, said SLEEPER being a citizen of the Dominion of Canada, said HORTON a citizen of the United States, both residing at Worcester, in the county of Worcester and State of Massachusetts, have invented a new and useful Machine for Cutting Wire into Lengths, of which the following is a specification.

This invention relates to a machine for feeding wire, straightening it in the ordinary way, and then cutting it accurately into uniform lengths and delivering it.

The principal objects of the invention are to provide means whereby a machine of this kind can be provided with the belts for the cutting apparatus and for the straightening flier taken from a single counter-shaft without twisting the belts, constituting a parallel belt machine; to provide means for cutting the wire into its lengths in an accurate and unvarying manner; to provide automatic means for instantly releasing the wire from its end stop after it is cut so that it can be delivered directly from this machine into a predetermined position in another machine for further operation if desired; and to provide means for adjusting the length of the wire of such a nature that the machine will act with equal effectiveness for long and short wires and the adjustment will be simple and convenient.

The invention also involves improvements in the details of the various parts and the manner of combining them with each other.

Reference is to be had to the accompanying drawings, in which—

Fig. 2 is a front elevation;

Fig. 3 is an end elevation, as indicated by the lines 3—3 in Figs. 1 and 2;

Fig. 4 is a plan partly in horizontal section showing the means for governing the length of the wire and actuating the cutting off mechanism;

Figs. 5 and 6 are similar views showing these parts in subsequent positions;

Fig. 7 is an end view of the adjustable stop plate for the wire;

Fig. 8 is a sectional view on the line 8—8 of Fig. 1, showing the clutch and its connections;

Fig. 9 is a similar view showing the clutch in a subsequent position;

Figure 1:
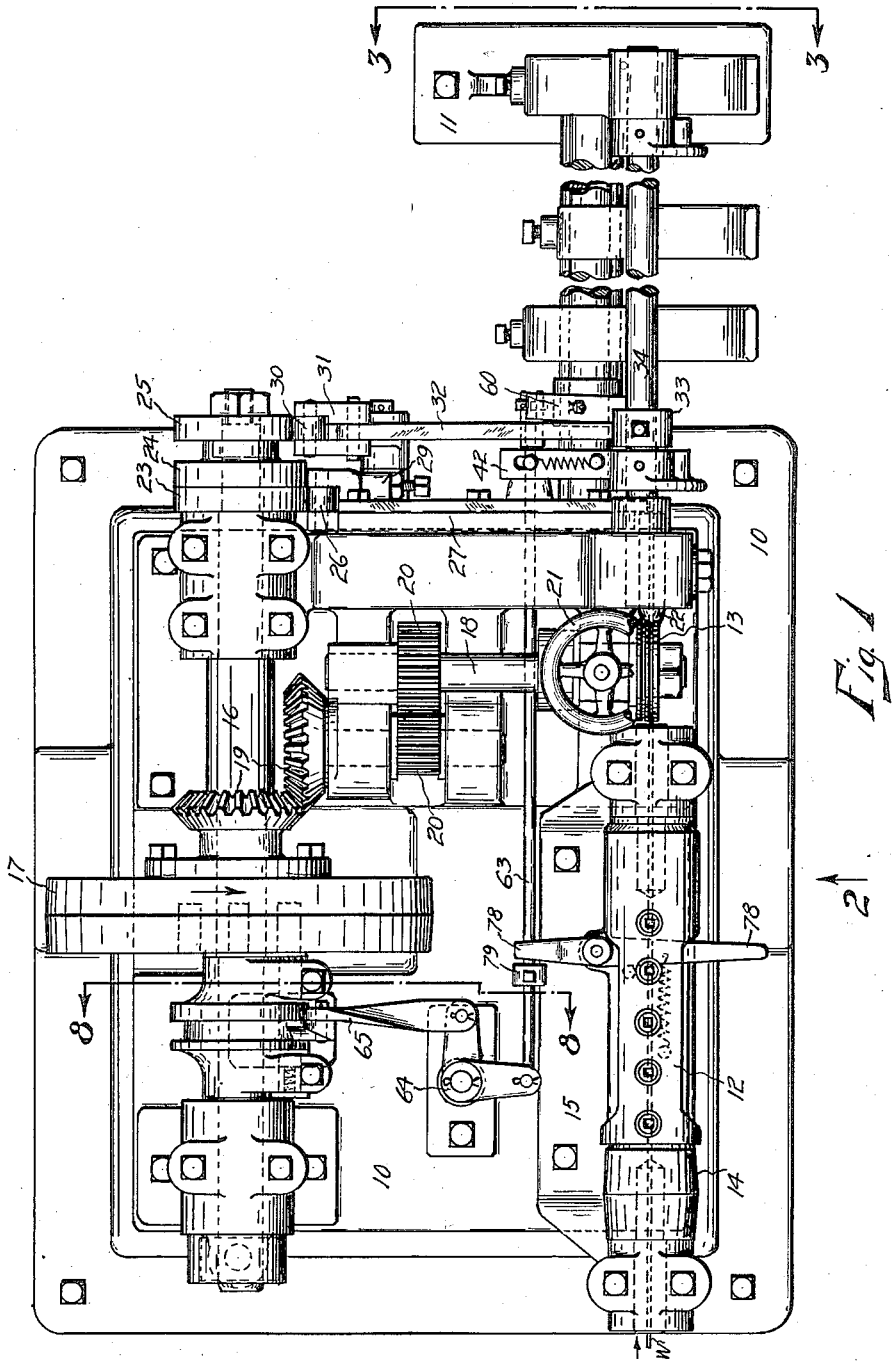
Figure 1 is a plan of a machine constructed in accordance with this invention.

Figs. 10 and 11 are elevations of the clutch looking in the directions of the arrows 10 and 11 in Figs. 9 and 8 respectively; and Fig. 12 is a sectional view of the clutch pin of the fly wheel on the line 12—12 of Fig. 11.

We have shown the machine as mounted on a base 10 with a pedestal stand 11 beside it for supporting certain parts. On this base is mounted the usual rotary flier 12 for straightening the wire which is drawn through it by a pair of feeding rolls 13. This flier is mounted on two horizontal studs which run in a bracket 15 which is in turn mounted on the base 10, as shown, and driven by a belt on a pulley 14. Any ordinary kind of flier can be employed in connection with this invention and the details therefore are not described herein.

On a shaft 16 parallel with the shaft of the flier is a fly wheel 17 for driving it. The two belts on this fly wheel and pulley can be taken from the same counter-shaft without twisting them, thus reducing expense in that respect and simplifying the machine. This shaft 16 is arranged to drive two shafts 18 one over the other through constantly rotating bevel gears 19 and spur gears 20. One of the pair of grooved feed rolls 13 is on each shaft 18. The pressure of one of these rolls on the other is regulated by a hand wheel 21 in a well known way and the wire is delivered between these two rolls into a guide 22.

On the shaft 16 there are three edge cams 23, 24 and 25. The cam 23 operates a roll 26 on the end of a slide 27 having a cutting-off blade 28 at its other end located at the end of the guide 22 for cutting off the wire at that point. This cam forces the cutting blade outwardly in its cutting direction in a positive manner and it is drawn back by the cam 24 operating on a fork 29 on the other side of the cam and adjustably connected with the slide 27 by a screw 87. Thus, both motions are positive.

The cam 25 operates a roller 30 connected by the rocking arm 31 with a link 32. This link is pivoted to an arm 33 fixed to a horizontal shaft 34 at the top of the machine for rocking the same. On this shaft 34 there are a series of arms 35 extending downwardly and each connected with a long horizontal movable jaw 36 which constitutes half of a box for receiving the wire from a guide 22. This jaw 36 moves out and in as the shaft 34 rocks against the action of a spring 37 which draws it back. The other half of this box consists of a long stationary jaw 38 fixed on the frame 11. These two jaws have semi-circular recesses registering with each other for receiving the wire.

On the slide 27 there is a side projection 40 which is provided with a stud 41 passing through an elongated slot in a latch 42 pivoted on the stud. A spring 43 connects the stud with a fixed point on the latch and normally draws the latch back as far as it will go. This latch is provided with a reduced neck 44 formed by providing a slanting surface 45 on the left side and has a projecting stop 46 at the end of it on the same side. On the other side there are two positively slanting surfaces 47 and 48. This is guided in a perforation through a stationary plate 50 fixed on the stationary jaw 38. This perforation has parallel opposite slanting sides extending only part way through it from opposite sides for registering and co-operating with the surfaces 45 and 47 of the latch. It has straight transverse surfaces beyond these slanting surfaces that are parallel with the direction of motion of the slide. At a point adjacent to, and in contact with, the plate 50 is another perforated steel plate 51. This has a slanting edge for co-operating with the slanting surface 48 and is capable of sliding longitudinally with respect to the stationary plate 50. This steel plate 51 is fixed to a long slide bar 52 which has a perforation for the latch, the opposite transverse surfaces of which are straight and parallel with the direction of motion of the slide 27. The motion of the cutter slide 27 towards the wire obviously effects the motion of the latch 42 and this latch controls in certain ways, as will appear, the motion of the slide 52. The latch is capable of a slight swinging motion limited by the passage through the stationary plate 50. The operation of these parts will be stated after the other mechanism connected therewith has been described.

Mounted adjustably at any point along the slide 52 there is an adjustable stop plate 54 having a set screw 55 for fixing it in adjusted position on its slide. This stop plate has a passage 56 through it fitting the top half of the slide bar 52. It is also provided with a thin plate 57 extending down from it having at the end a solid cylindrical stop 58 extending some distance below the stop plate itself. This thin plate 57 extends down through a space between the two jaws 36 and 38 that make up the two halves of the box and the stop 58 is located in the passage formed by the two semi-cylindrical grooves and is intended to be engaged by the wire when it is fed through the box. The effect of this, indicated in Fig. 4, is to cause the wire being fed forward to come up against this stop 58 and move it from the position shown in Fig. 4 to the position shown in Fig. 5. This, of course, moves the slide bar 52 with it until the rear wall of the opening through this plate engages the stop projection 46 on the end of the latch 42. This happens while the transverse surfaces of the latch are resting on the corresponding surfaces of the opening in the stationary plate 50, as indicated in these two figures. Consequently, the latch cannot swing laterally and the slide 52 is positively stopped in that position and also the wire is necessarily stopped just at that point. This will be understood as possible because the ordinary feeding device employed does not feed the wire positively under opposition. It is now the clutch on the shaft 16 having been tripped that the cam 23 operates to push the cutter 28 forward and sever the wire, as indicated in Fig. 6. This also moves the latch 42 forward with it so that the flat surfaces that appear horizontal in these figures, but are vertical in the machine, as illustrated, slide off the corresponding perforations in the plate 50 and the slanting surfaces 45 and 47 of the slide engage the pair of surfaces parallel therewith in this perforation. This action forces the latch 42 over to the right of the machine into the position shown in Fig. 6. This releases the slide 52 from positive contact with the stop projection 46 or any other part of the latch 42 and it is free to move further forward in the direction of the arrow in Fig. 6. In fact, the slanting surface 48 on the latch 42 positively forces it a little further forward into the position indicated in Fig. 6. This moves the stop 58 in the same direction out of contact with the end of the wire and just as the wire is severed at one end the pressure on the other end is relieved and the wire is immediately released and allowed to drop, it being understood that just at that time the cam 25 has rocked the shaft 34 and opened the movable jaw 26.

The slide 52 now has to be moved back to its proper position for registering the end of the wire and measuring and governing the length cut off. This is done by means of a lever 60 pivoted on a stud 61 on the stiffening rods and connected by a plate 62 with the slide 52 for swinging it. This lever is operated by a horizontal push rod 63 extending back into the head of the machine connected by a bell crank 64 with a link 65 for operating the clutch shown on the last sheet of drawings.

This link 65 is connected with and operated by a clutch latch lever 66 having a curved projection 67 flat on one edge, the opposite edge being wedged shaped. This link lies in an annular groove 68 in the center of the clutch body 70 which is fixed on the shaft 16. Also on this clutch body there is a longitudinal groove in which is located a slidable clutching bolt 72.

Normally the end of the clutch latch lever 66 is in the groove 68 and the latch 73 in the bolt 72 holds it in the position shown in Fig. 10 against the action of a spring tending to force the bolt to the right, thus keeping the clutch inoperative. When this clutch latch lever 66 is drawn back to the position shown in Fig. 8 and also in Fig. 11, it loses its control of the bolt 72 and the spring forces it over to the right, as shown in Fig. 11, so that one of the four operating surfaces 74 shown on the hub of the driving fly wheel 17 will come into contact with the bolt and lock the clutch to the fly wheel 17 on the hub of which these four latching surfaces 74 are fixed. When, however, the lever 66 is forced in again, the next time the groove comes adjacent to its wedge-shaped top edge at 67, the same will engage the latch in the ends of the bolt 72 and as it rotates further to the position shown in Fig. 10 will wedge or draw out the bolt, as illustrated therein.

For the purpose of accomplishing this result, the lever 66 is provided with an arm 76 projecting around to the back of the clutch and adapted to be engaged by a cam projection 77 on the clutch body 70 and forced to the position shown in Fig. 9. This necessarily forces the clutch latch 66 back into the position shown in Fig. 10 and thus draws back the bolt 72, as described above. This releases the power from the shaft 16 and stops the cams.

This clutch can also be normally operated by a lever 78 engaging a collar 79 fixed at any desired position on the rod 63 so that the wire can be cut off at any time when desired.

*Operation.*

With the two belts running on the pulleys 14 and 17 and the end of the wire W threaded through the straightening flier and inserted between the revolving feed rolls 13, the flier is turning at full speed, but the shaft 16 is stopped. The operation is started by manually operating the lever 78 to force the collar 79 and the rod 63 to the left in Fig. 1. This pulls the link 65 and brings the parts 66 and 76 to the position shown in Fig. 8. The latch 66 being drawn out, the bolt 72 is released and its spring forces it inwardly so that some time during the next quarter revolution of the driving fly wheel 17, the bolt will come into contact with one of the projecting driving surfaces 74 and the clutch together with the shaft 16 will be driven positively from the fly wheel 17.

The wire W is drawn through the flier in the usual way, by contact with the grooves in the rolls 13, straightened, and delivered through the guide 22 and into the box 36—38. During a complete revolution of the shaft 16 the cam 77 pushes out the arm 76 and pulls in the lever 66 to the positions shown in Fig. 9 which disengages the clutch. This first draws in the link 65 and pushes outwardly toward the right the rod 63 which moves the lever 60 and therefore the slide 52, from about the position shown in Fig. 6 to that shown in Fig. 4. Now the end of the wire comes into contact with the stop 58 and forces that stop back, that is, to the right in Fig. 1. This, as stated, moves the stop 58 and with it the stop plate 54 and the slide 52 from the position shown in Fig. 4 to that shown in Fig. 5 when it is limited positively and exactly by the stop projection 46. During this time all these cams are operating on their concentric portions for more than three quarters of a revolution.

The shaft 16 continues to rotate less than a quarter of a revolution before the bolt 72 is withdrawn by the wedge 67 and the shaft disconnected from the power. During this time the slide 27 moves forward to the position shown in Fig. 6 to cut off the wire and displace it a distance slightly greater than its diameter. The jaw 36 moves out at the same time to permit this action to take effect and the slide latch 42 moves forward to the position shown in Fig. 6, thus unlocking the slide 52, by moving the stop 46 away from it, and allowing it to be moved in the direction of the arrows in Figs. 5 and 6. It is moved in this direction by the forward motion of the latch 42 acting on the inclined surfaces and thus moves the stop 58 out of contact with the end of the wire and instantly allows the wire to drop away from the machine and be delivered.

The motion of the slide 52 to this limiting position operates the rod 63 through the lever 60 to again restore the lever 66 to starting position Fig. 8. The stop 58 is not now in the right position to gauge the length of the wire and it has to be moved back beyond that position. It will be remembered that while the shaft 16 has been rotating through the last quarter of a revolution the arms 66 and 76 have remained in the position shown in Fig. 9 though not locked in that position. Just before the clutch 70 automatically released and disconnected the cam shaft 13 from the fly wheel by withdrawing the bolt 72, the arms 66 and 76 were moved to the position shown in Fig. 9. This as stated above placed stop 58 back in its proper position, moving the slide 52 back to the position shown in Fig. 4 ready for repetition of these actions.

In this way the wires are cut off to absolutely uniform lengths and released at the right instant so that the severed wires will freely drop laterally from the machine. This release is a delicate feature of the machine which is provided for by this mechanism in such a way as to secure automatic action at all times and it is to be noted that the stop is restored to exactly its original position every time and that the distance it moves to cause the slides to act is positively limited although the position of the stop is adjustable within wide limits.

It is an important feature also to have the belts of the wire feeding machine parallel, thus avoiding complications in countershafting twisted belting, or gearing and not materially increasing the cost of the machine itself.

Although we have illustrated and described only a single form of the invention, we are aware of the fact that modifications can be made therein by any person skilled in the art without departing from the scope of the invention as expressed in the claims. Therefore we do not wish to be limited to all the details of construction herein shown and described but what we do claim is:

1. In a wire feeding and cutting-off machine, the combination with a guide for the wire, of a blade for cutting the wire off at the end of the guide, a slide stop for limiting the length of the wire, a lever connected with said stop and being operated by it, a driving fly wheel, a shaft on which said driving wheel is mounted to rotate freely, a clutch keyed to said shaft, and means located adjacent to the blade and connected with said lever for operating the clutch to control its connection with the wheel.

2. In a wire feeding, measuring and cutting machine, the combination with means for feeding the wire and a blade for cutting off the wire, of a stop for receiving the end of the wire, and a latch movable with the cutting-off blade and having means for moving the stop from the end of the wire and release the wire from the machine.

3. In a wire measuring and cutting machine, the combination with a blade for cutting off the wire, of a stop for receiving the end of the wire, and a latch movable with the cutting-off blade and having a stop projection located at the end of the machine near said blade for limiting the motion of the stop and thus measuring the wire cut off.

4. In a wire feeding, measuring and cutting machine, the combination with means for feeding the wire and a blade for cutting off the wire, of a stop for receiving the end of the wire, a movable slide bar on which said stop is mounted, and a latch movable with the cutting-off blade and having a stop projection located at the end of the machine near said blade for limiting the motion of the slide bar forward and thus measuring the wire cut off, said latch also being movable to a position to unlock the slide.

5. In a wire feeding, measuring and cutting machine, the combination with means for feeding the wire and a blade for cutting off the wire, of a stop for receiving the end of the wire, a longitudinally movable slide bar on which said stop is mounted, and a latch movable with the cutting-off blade and having a stop projection located at the end of the machine near said blade for limiting the motion of the slide bar forward and thus measuring the wire cut off, said latch also having means for moving the slide bar further forward to remove the stop from the end of the wire and release the wire from the machine.

6. In a wire feeding and cutting machine, the combination with non-positive means for feeding the wire forward longitudinally, a box having a passage therein for receiving the wire therefrom, a stop projecting into the passage, a movable slide bar on which said stop is mounted, whereby when the wire is fed into contact with the stop the slide bar will be moved thereby in the direction of the wire feed, means for positively limiting the motion of the stop after it engages the wire to give the wire a definite length, and means for automatically cutting off the wire when it is positively stopped.

7. In a wire feeding and cutting machine, the combination with means for feeding the wire forward longitudinally, a stop for the wire, a movable slide bar on which said stop is mounted, whereby when the wire is fed into contact with the stop the slide will be moved in the direction of the wire feed, means for automatically cutting off the wire, means for releasing the slide bar from its limiting position, and means for positively moving the slide bar further forward by the power to disengage the stop from the end of the wire when it is cut off and allow it to be delivered.

8. In a wire feeding and cutting machine, the combination with means for feeding the wire forward longitudinally, a box having a passage therein for receiving the wire therefrom, a stop adjustably mounted on said box and projecting into the passage, a movable slide bar on which said stop is mounted, whereby when the wire is fed into contact with the stop the slide will be moved in the direction of the wire feed, means for cutting off the wire, means for releasing the slide bar from its limiting position, means for positively moving the slide further forward by the power to disengage the stop from the end of the wire when it is cut off and allow it to be delivered, means for automatically disconnecting the releasing means from the source of power, and means operated by said slide bar for reconnecting the releasing means with the power by motion of the slide to the last named position.

9. In a wire feeding, measuring and cutting machine, the combination with a pair of feeding rolls for feeding the wire and a blade for cutting off the wire, of a stop for receiving the end of the wire, a longitudinally movable slide bar on which said stop is mounted, whereby when the wire engages the stop it will move the slide bar, a latch movable with the cutting-off blade and having a stop projection for limiting the motion of the slide bar forward and thus measuring the wire cut off, said latch also being movable to a position to unlock the slide and having means for moving the slide bar further forward to remove the stop from the end of the wire and release the wire from the machine.

10. In a wire feeding, measuring and cutting machine, the combination with a pair of feeding rolls for feeding the wire, of a blade for cutting off the wire, a shaft for operating the blade, a stop for receiving the end of the wire, a longitudinally movable slide bar on which said stop is adjustably mounted, whereby when the wire engages the stop it will engage the slide, a latch movable with the cutting-off blade and having a stop projection for limiting the motion of the slide bar forward and thus measuring the wire cut off, said latch also being movable by the shaft to a position to unlock the slide bar and having means for moving the slide bar further forward to remove the stop from the end of the wire and release the wire from the machine, means for automatically disconnecting the shaft from a source of power at the end of a revolution of the shaft, and means connected with said slide bar for automatically re-connecting the shaft with the source of power when the slide bar moves to the last named position.

11. In a wire feeding and cutting-off machine, the combination with a guide for the wire, of a blade for cutting the wire off at the end of the guide, a slide bar movable parallel with the direction of the wire, a stop adjustably mounted on said slide bar for limiting the length of the wire and measuring it exactly, a lever pivotally connected with said slide bar for operating it and for being operated by it, a reciprocable rod connected with said lever, a driving fly wheel, a shaft on which said driving wheel is mounted to rotate freely, a clutch keyed to said shaft, and means connected with said rod for operating the clutch to control its connection with the wheel.

12. In a wire feeding machine, the combination with a power shaft, and a power receiving wheel freely rotatable thereon, of a circumferentially grooved clutch keyed to said shaft and having a longitudinally slidable bolt adapted to engage the wheel to clutch the wheel to the shaft, and a latch having a wedge-shaped end mounted adjacent to the clutch and adapted to lie in said groove, the bolt having a passage open to receive the wedge-shaped end of the latch and arranged to be withdrawn positively by the latch when in its innermost position.

13. In a wire feeding machine, the combination with a power shaft and a power receiving wheel freely rotatable thereon, of a clutch keyed to said shaft and having a longitudinally slidable bolt adapted to engage the wheel to clutch the wheel to the shaft, a latch having a wedge-shaped end mounted adjacent to the clutch, the clutch having a groove in which said end is adapted to lie, the bolt having a passage open to receive the wedge-shaped end of the latch, whereby the bolt will be withdrawn by the latch when in its innermost position, a projecting cam on the other side of said clutch, and an arm on said latch in the path of said projection, whereby during a complete revolution the projection will move the arm away from the clutch and the latch into its groove to withdraw the bolt.

In testimony whereof we have hereunto affixed our signatures.

FRANK. H. SLEEPER.
JAMES A. HORTON.